March 23, 1965  M. J. SINTON  3,174,162
ELECTRIC BLANKET CONTROL HOLDER
Filed Jan. 28, 1963
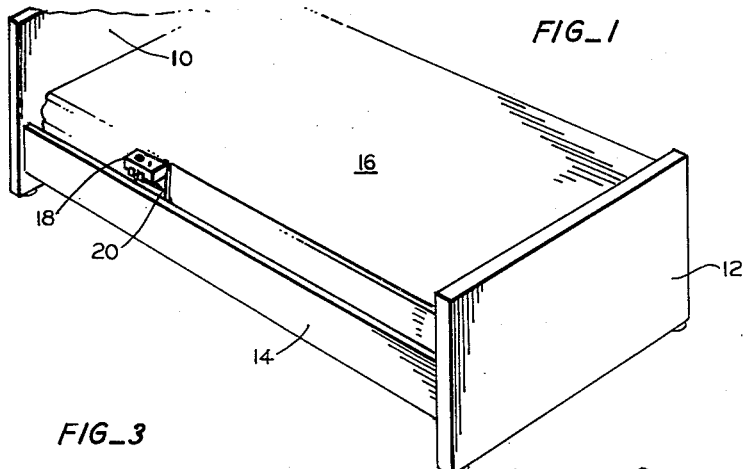
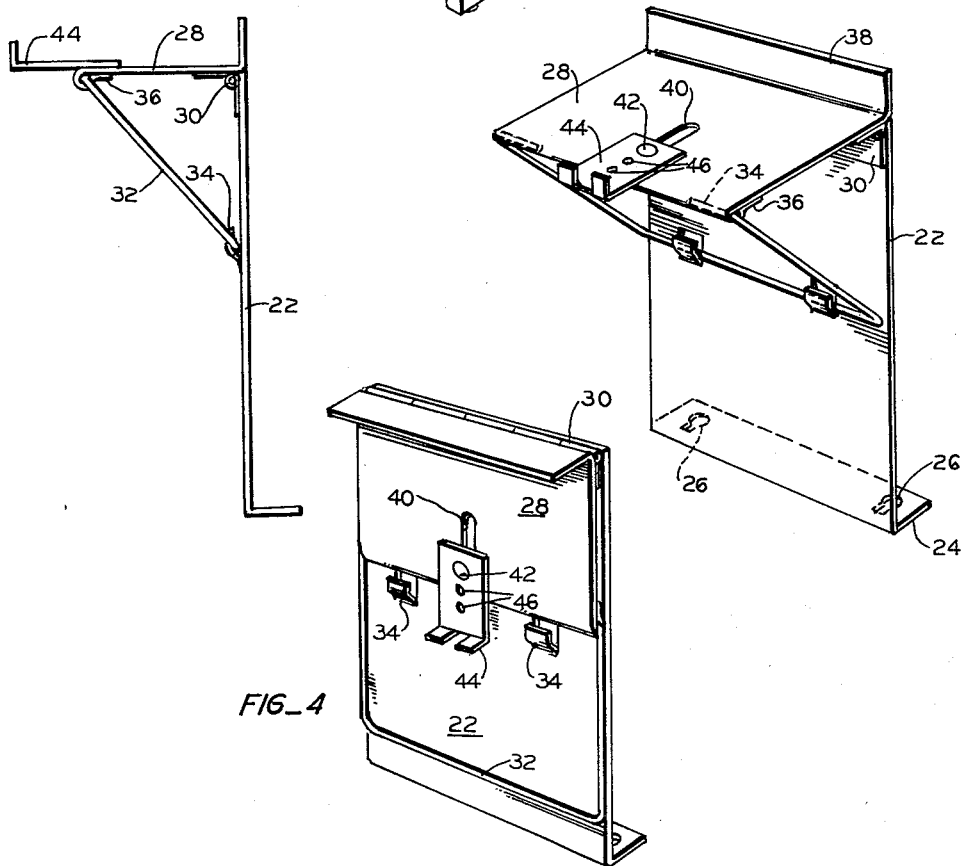
INVENTOR.
MARY JANE SINTON
BY
*Naylor & Neal*
ATTORNEYS

United States Patent Office 3,174,162
Patented Mar. 23, 1965

3,174,162
ELECTRIC BLANKET CONTROL HOLDER
Mary Jane Sinton, 17190 High Road, Sonoma, Calif.
Filed Jan. 28, 1963, Ser. No. 254,260
1 Claim. (Cl. 5—317)

This invention relates to brackets and more particularly to apparatus for mounting an electric blanket control unit on a bed.

While electric blankets are in relatively widespread use, substantial inconvenience is attendant to their use by reason of the fact that they employ movable control units which find no convenient mounting place adjacent to the beds on which the blankets are used. Often the control units are placed on a bed side table where they may be bumped off onto the floor, or they are merely placed on the floor adjacent to the bed where they are relatively inaccessible and may be bumped to positions under the beds thereby aggravating the problem.

In accordance with this invention, mounting means are provided for permanently attaching the control units of electric blankets to the beds on which the blankets are used where the control units are readily accessible and always found in a predetermined place. Additionally, the mounting means permit the control units to be moved into a storage or retracted position where they do not provide a bulky appendage on the bed which would impair the neatness of the bedroom when the beds are made.

Other objects and advantages of the invention will become apparent from the following description read in conjunction with the attached drawings in which:

FIG. 1 is a perspective view of a bed employing the apparatus of this invention;

FIG. 2 is an enlarged perspective view of the control unit mounting means of this invention;

FIG. 3 is a view in side elevation of the apparatus of FIG. 2 showing the apparatus in its operative position, and FIG. 4 is a perspective view of the bracket of FIGS. 2 and 3 showing the bracket in its retracted or storage position.

Referring now in detail to the drawings and particularly to FIG. 1, a bed is illustrated therein having head and foot ends 10 and 12 respectively, a side portion 14 and a top surface 16 adapted to receive a conventional bedspread. An electric blanket control unit 18 is mounted on a bracket 20 (described in detail hereinafter) with the control unit 18 mounted at the side 14 of the bed adjacent to the head end 10 and below the level of the top surface 16 whereby the control unit is readily accessible to a person lying in the bed and may be covered by a bedspread on the bed thereby deadening the sound of a conventional thermostatically controlled relay in the control unit.

As illustrated in FIGS. 2-4, the bracket for mounting the control unit has a lower frame portion 22 carrying suitable means at its lower end, here shown as apertured flange 24, permitting the frame portion 22 to be permanently mounted on a bed as by the threading of screws through apertures 26 into the box springs of the bed. An upper frame portion 28 is hingedly connected to the top of the frame portion 22 by means of a hinge 30 which permits the upper frame portion 28 to be moved between the position of FIG. 3 where it projects laterally from the bed generally perpendicular to the lower frame portion 22 and the position of FIG. 4 where it lies parallel to and adjacent to the lower frame portion 22 depending from the hinge 30. A wire bail 32 is pivotally connected to the upper frame portion 28 by means of inturned portions 34 thereon received within ears 36, and the lower end of the bail 32 may be inserted into struck out ears 34 in the lower frame portion 22 to support the upper frame portion 28 in its projected position of FIG. 3.

As indicated in FIGS. 2-4, the upper frame portion 28 has an upturned lip 38 thereon and has an elongated slot 40 therein which receives a rivet 42 on a sliding bracket 44; a suitable screw and wing nut (not shown) may be inserted through auxiliary holes 46 in the bracket 44 for adjustably clamping the bracket 44 in a plurality of positions on the upper frame portion 28 to thereby clamp the electric blanket control unit 18 onto the upper frame portion 28. The length of the slot 40 is made fairly large to permit the upper frame portion 28 with its bracket 44 to receive a wide variety of different kinds of electric blanket control units.

When the electric blanket control unit 18 is mounted on a bed on the bracket 20, shown in FIGS. 2-4, the bracket may be adjusted to its position of FIGS. 2 and 3 before the user thereof retires to position the control unit for simple access and manipulation, and when the bed is to be made, the bail 32 may be removed from the ears 34 to drop the upper frame portion 28 to the position shown in FIG. 4 where the control unit 18 is retracted to provide a minimum protrusion underneath the bedspread.

While one specific embodiment of this invention has been illustrated and described in detail herein, it is obvious that many modifications thereof may be made without departing from the spirit and scope of the invention.

I claim:

Apparatus for mounting an electric blanket control unit on a bed which comprises a first frame portion having upper and lower ends with attachment means on said lower end for attaching said first frame portion to a bed at one side thereof, a second frame portion hingedly connected to said first frame portion at the upper end thereof and having mounting means thereon for attachment of an electric blanket control unit thereto, an arm pivotally connected to one of said frame portions at a position remote from the point of hinged connection between said frame portions, and an ear on the other of said frame portions remote from said point of hinged connection with said ear releasably connected to said arm and supporting said arm in a position as the hypotenuse of a right triangle of which said frame portions are the legs whereby said arm may be released from said ear to permit said arm and said frame portions to be moved to positions parallel to each other.

References Cited in the file of this patent
UNITED STATES PATENTS

| | | |
|---|---|---|
| 1,135,181 | Hastreiter | Apr. 13, 1915 |
| 2,510,900 | O'Neil | June 6, 1950 |
| 2,913,740 | Eldridge | Nov. 24, 1959 |